Patented Oct. 20, 1925.

1,558,252

UNITED STATES PATENT OFFICE.

JOSEPH G. DINWIDDIE, OF PENNS GROVE, NEW JERSEY, ASSIGNOR TO E. I. DU PONT DE NEMOURS & COMPANY, OF WILMINGTON, DELAWARE, A CORPORATION OF DELAWARE.

VAT DYESTUFF AND PROCESS OF MAKING SAME.

No Drawing.   Application filed January 8, 1925.   Serial No. 1,153.

*To all whom it may concern:*

Be it known that I, JOSEPH G. DINWIDDIE, a citizen of the United States, and a resident of Penns Grove, in the county of Salem and State of New Jersey, have invented a certain new and useful Vat Dyestuff and Process of Making Same, of which the following is a specification.

This invention relates to the production of a violet vat dyestuff by the condensation of a di-halo-isatin-chloride with an hydroxy-methyl-halo-thionaphthene, and particularly of dibromisatin-chloride with 2-hydroxy-3-methyl-5-chloro-thionaphthene, having the formula:

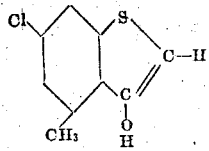

German Patent No. 193,150 describes a violet dyestuff produced by condensing isatin chloride with 2-hydroxy-thionaphthene and subsequently brominating this condensation product in nitrobenzene, sulfuric acid or other inert solvent.

By the process described below a new dye is obtained, which has properties superior to that described in German Patent No. 193,150 in regard to brightness, shade and tinctorial value.

My invention may be illustrated by the following specific example:

Heat under reflux with mono-chlorobenzene or another suitable inert solvent 10.35 parts of dibromisatin together with a slight excess of phosphorus pentachloride (for example, with 8.52 parts of the commercial product) until a clear red brown solution is obtained. This solution is mixed with good stirring for at least five minutes with a solution, in an inert solvent such as benzene, of the molecularly equivalent amount of 2-hydroxy-3-methyl-5-chloro-thionaphthene. When sufficient time, say half an hour, has elapsed to insure that the reaction is completed, the dyestuff is filtered off, washed with a solvent such as benzene, then with alcohol and finally dried in an oven at 50-60° C. The dyestuff in powder form has a brilliant red-blue shade; it may be used in the form of powder or may be made into a paste for greater ease in dissolving. Said dyestuff dyes cotton from a yellow orange hydrosulfite vat a bright full shade of violet of very good fastness to light, washing, chlorine, etc.

The temperature at which the reaction between the dibromisatin and the thionaphthene derivative is carried on is, within wide limits, immaterial. The dyestuff has been made with the benzene solution of 2-hydroxy-3-methyl-5-chloro-thionaphthene at room temperature, 20° C., and the dibromisatin chloride solution in chlor-benzene varying from room temperature to the boiling point of mono-chlor-benzene, which is 132° C.

In the condensation of dibromisatin with phosphorous pentachloride, hydrochloric acid is split off as is also the case during the condensation of the dibromisatin-chloride with 2-hydroxy-3-methyl-5-chloro-thionaphthene.

The reactions which occur are probably as follows:

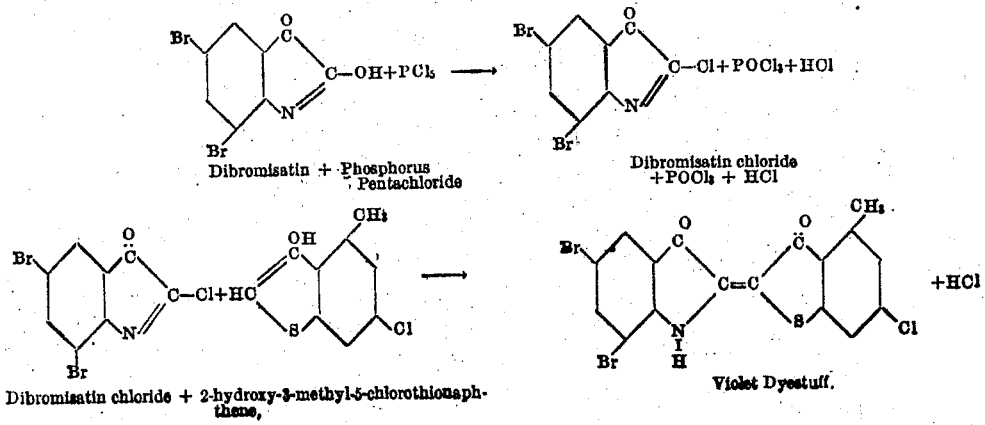

Dibromisatin + Phosphorus Pentachloride

Dibromisatin chloride + POCl₃ + HCl

Dibromisatin chloride + 2-hydroxy-3-methyl-5-chlorothionaphthene,

Violet Dyestuff.

Although in the above example certain specific conditions of operation have been mentioned, it will be understood that my invention is not limited thereto, but that the process may be modified in various ways without departing from the spirit or scope of my invention.

The new dyestuffs above described are chiefly useful in the dyeing of cotton, but they may also be used to advantage in the dyeing of wool and silk.

I claim:

1. The process of producing a vat dyestuff which comprises condensing a halogenated isatin-chloride with one molecularly-equivalent amount of an hydroxymethyl-halo-thionaphthene.

2. The process of producing a vat dyestuff which comprises condensing a halogenated isatin-chloride with one molecularly-equivalent amount of 2-hydroxy-3-methyl-5-chloro-thionaphthene.

3. The process of producing a vat dyestuff which comprises mixing a solution of di-bromisatin-chloride in an inert solvent while stirring, with a solution in an inert solvent of 2-hydroxy-3-methyl-5-chloro-thionaphthene, and filtering and drying the precipitate formed.

4. The process which comprises heating 10.35 parts of dibromisatin dissolved in an inert solvent under a reflux condenser with about eight parts of phosphorus pentachloride until a clear red-brown solution is obtained, mixing this solution, while stirring, with a solution of 2-hydroxy-3-methyl-5-chloro-thionaphthene, and recovering the precipitate.

5. As a new composition of matter, a product obtainable by condensing a dibrom-isatin-chloride with 2-hydroxy-3-methyl-5-chloro-thionaphthene, said product having, in powder form, a brilliant red-blue shade, and dyeing cotton fiber from a yellow-orange hydrosulfite vat a bright full shade of violet of excellent fastness to light, washing, and chlorine.

6. As a new composition of matter, a product obtainable by condensing a dibrom-isatin-chloride with 2-hydroxy-3-methyl-5-chloro-thionaphthene, and having most probably the following graphical formula:—

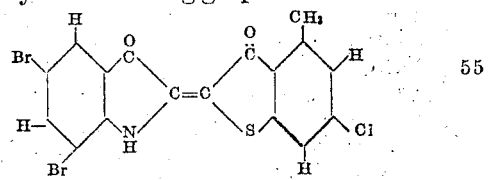

7. A dyestuff obtainable by condensing a di-halo-isatin-chloride with an hydroxymethyl-halo-thionaphthene, and purifying the resulting condensation product, said dyestuff dyeing cotton from a hydrosulfite vat a violet color of excellent fastness to light, washing, and chlorine.

8. Textile material dyed with a dyestuff covered by claim 7.

In testimony whereof I affix my signature.

JOSEPH G. DINWIDDIE.